(12) United States Patent
Kurita et al.

(10) Patent No.: US 8,773,801 B2
(45) Date of Patent: Jul. 8, 2014

(54) MAGNETIC-RECORDING HEAD WITH FIRST THERMAL FLY-HEIGHT CONTROL ELEMENT AND EMBEDDED CONTACT SENSOR ELEMENT CONFIGURABLE AS SECOND THERMAL FLY-HEIGHT CONTROL ELEMENT

(75) Inventors: Masayuki Kurita, Kanagawa (JP); Toshiya Shiramatsu, Kanagawa (JP); Kenji Kuroki, Kanagawa (JP); Yuki Shimizu, Kanagawa (JP)

(73) Assignee: HGST Netherlands B.V., Amsterdam (NL)

( * ) Notice: Subject to any disclaimer, the term of this patent is extended or adjusted under 35 U.S.C. 154(b) by 930 days.

(21) Appl. No.: 12/909,694

(22) Filed: Oct. 21, 2010

(65) Prior Publication Data

US 2012/0099218 A1 Apr. 26, 2012

(51) Int. Cl.
*G11B 5/60* (2006.01)

(52) U.S. Cl.
USPC .............................................. 360/55; 360/75

(58) Field of Classification Search
None
See application file for complete search history.

(56) References Cited

U.S. PATENT DOCUMENTS

| | | |
|---|---|---|
| 5,537,034 A | 7/1996 | Lewis |
| 5,822,139 A | 10/1998 | Ayabe |
| 5,894,376 A | 4/1999 | Rinard |
| 5,917,670 A | 6/1999 | Scaramuzzo |
| 6,034,829 A | 3/2000 | Suzuki et al. |
| 7,023,660 B2 | 4/2006 | Hsiao et al. |
| 7,035,031 B2 | 4/2006 | Kim et al. |
| 7,068,468 B2 | 6/2006 | Kamijima |
| 7,153,192 B1 | 12/2006 | Kurita et al. |
| 7,153,193 B1 | 12/2006 | Kurita et al. |
| 7,190,543 B2 | 3/2007 | Suk |
| 7,190,547 B2 | 3/2007 | Khurshudov et al. |
| 7,583,467 B2 | 9/2009 | Lee |
| 7,589,928 B2 * | 9/2009 | Roy et al. ........................ 360/75 |
| 7,649,713 B2 | 1/2010 | Ota et al. |

(Continued)

OTHER PUBLICATIONS

"Magnetic head slider with plural heaters for flying-height control", http://priorartdatabase.com/IPCOM/000152844/, Abstract, May 2007.

(Continued)

*Primary Examiner* — Wayne Young
*Assistant Examiner* — James L Habermehl

(57) ABSTRACT

A magnetic-recording head with a first thermal fly-height control (TFC) element and an embedded contact sensor element (ECSE) configurable as a second TFC element. The magnetic-recording head includes a write element, a read element, a first heater element, and an ECSE. The write element is configured for writing data to a magnetic-recording disk. The read element is configured for reading data from the magnetic-recording disk. The first heater element is configured as a first TFC element to coarsely adjust a fly-height of the magnetic-recording head with respect to the magnetic recording disk. The ECSE is configured to detect a contact with the magnetic-recording disk, and to function as a second heater element that is configured as a second TFC element to finely adjust the fly-height. The first heater element is configured with a first stroke-length larger than a second stroke-length of the second heater element for adjusting the fly-height.

21 Claims, 5 Drawing Sheets

(56) References Cited

U.S. PATENT DOCUMENTS

| | | | |
|---|---|---|---|
| 7,796,356 B1* | 9/2010 | Fowler et al. | 360/75 |
| 7,800,858 B1* | 9/2010 | Bajikar et al. | 360/75 |
| 7,952,829 B2* | 5/2011 | Ionescu | 360/75 |
| 7,974,039 B1* | 7/2011 | Xu et al. | 360/75 |
| 8,139,310 B1* | 3/2012 | Hogg | 360/75 |
| 8,279,550 B1* | 10/2012 | Hogg | 360/75 |
| 2006/0146437 A1* | 7/2006 | Khurshudov et al. | 360/75 |
| 2008/0100965 A1* | 5/2008 | Oki | 360/234.3 |
| 2009/0279204 A1 | 11/2009 | Jang | |

OTHER PUBLICATIONS

Miyake, K et al., "Optimized Design of Heaters for Flying Height Adjustment to Preserve Performance and Reliability", http://ieeexplore.ieee.org/stamp/stamp.jsp?arnumber=4202847&isnumber=4202640, Abstract, Jun. 2007.

Zheng, Hao et al., "Numerical Simulation of a Thermal Flying Height Control Slider With Dual Heaterand Unsulator Elements", http://ieeexplore.ieee.org/stamp/stamp.jsp?arnumber=5257206&isnumber=5256997, Abstract, Oct. 2009.

* cited by examiner

MAGNETIC-RECORDING HEAD WITH FIRST THERMAL FLY-HEIGHT CONTROL ELEMENT AND EMBEDDED CONTACT SENSOR ELEMENT CONFIGURABLE AS SECOND THERMAL FLY-HEIGHT CONTROL ELEMENT

TECHNICAL FIELD

Embodiments of the present invention relate to a hard-disk drive (HDD) including a magnetic-recording head with a first thermal fly-height control (TFC) element and an embedded contact sensor configurable as a second TFC element.

BACKGROUND

Devices which use various types of recording disks, such as optical disks, magneto-optical disks, or flexible magnetic-recording disks, are known as disk drive devices. Of these, the HDD has spread widely as a storage device for computers and is becoming an indispensable information-storage device in current computer systems. In addition, HDD applications, such as video recording and playback devices, car navigation systems, or portable telephones, are increasing because of the superior characteristics of HDDs.

A magnetic-recording disk used in an HDD has a plurality of data tracks and a plurality of servo tracks formed in concentric circles on the magnetic-recording disk. A plurality of data sectors containing user data is recorded in each data track. Each servo track contains address information. The servo tracks are constructed from a plurality of servo data regions separated in the circumferential direction; and, one or a plurality of data sectors is recorded between the servo data regions. By accessing the desired data sector in accordance with the address information of the servo data, a magnetic-recording head can write data to a data sector and read back data from a data sector.

Typically, the HDD includes an integrated circuit (IC), which includes an amplification circuit for amplifying the signal of the head-slider disposed inside of the disk enclosure (DE). Normally, the IC is secured in a module in the vicinity of the pivot shaft of the actuator. Therefore, as described herein, this IC is referred to as arm electronics (AE), which is included in an arm-electronics (AE) module. The amplification circuit in the AE module amplifies the user data signal and the servo data signal read back by the head-slider, as well as the user data signal written by a magnetic-recording head. The AE module includes an internal logic circuit for advanced functions in addition to the amplification circuit. The AE module operates in response to commands from the controller of the HDD. Generally, the IC including the controller, which is also an encapsulated IC, is mounted on a control circuit printed-circuit board (PCB) secured to the outside of the DE of the HDD. The AE module also includes a register. The controller controls the AE module by storing control data in the register. For example, the AE module selects the magnetic-recording head of a designated head-slider, and converts, for example, the write current value, or alternatively, the sense current value, in response to commands from the controller. In addition, a power supply to a heater that is disposed on the head-slider is another function provided in circuits of the AE module.

The clearance between the magnetic-recording head flying in proximity with a recording surface of the magnetic-recording disk and the magnetic-recording disk, referred to herein as the "fly-height," may be reduced in order to increase the areal recording density (AD) on the magnetic-recording disk of the HDD. Therefore, a technique for adjusting the fly-height has been used in the art of magnetic-recording in HDDs. In this technique, a heater is disposed on the head-slider; and, the fly-height is adjusted by heating the magnetic-recording head with the heater. As described herein, this technique is referred to as thermal fly-height control (TFC). TFC supplies current to the heater to generate heat; and, the magnetic-recording head protrudes outwards by thermal expansion. Thus, the fly-height between the magnetic-recording disk and the magnetic-recording head may be reduced.

To increase AD, the fly-height between the magnetic-recording head of the head-slider and the magnetic-recording disk is made as small as possible. The current fly-height is approximately several nanometers (nm). When the design margins in the structure of the HDD are considered, the fly-height is at a value close to the limit. Therefore, engineers and scientists engaged in HDD manufacturing and development are interested in finding ways to increase AD by more accurately controlling the fly-height.

SUMMARY

Embodiments of the present invention include a magnetic-recording head with a first thermal fly-height control (TFC) element and an embedded contact sensor element (ECSE) configurable as a second TFC element. The magnetic-recording head includes a write element, a read element, a first heater element, and an ECSE. The write element is configured for writing data to a magnetic-recording disk. The read element is configured for reading back data from the magnetic-recording disk. The first heater element is configured as a first TFC element to coarsely adjust a fly-height of the magnetic-recording head with respect to the magnetic-recording disk. The ECSE is configured to detect a contact with the magnetic-recording disk, and configured to function as a second heater element that is configured as a second TFC element to finely adjust the fly-height. The first heater element is configured with a first stroke-length larger than a second stroke-length of the second heater element for adjusting the fly-height. Embodiments of the present invention also include an arm-electronics (AE) module for the magnetic-recording head and a hard-disk drive (HDD) including the magnetic-recording head and the AE module.

DESCRIPTION OF THE DRAWINGS

The accompanying drawings, which are incorporated in and form a part of this specification, illustrate embodiments of the invention and, together with the description, serve to explain the embodiments of the present invention.

Figure 1:
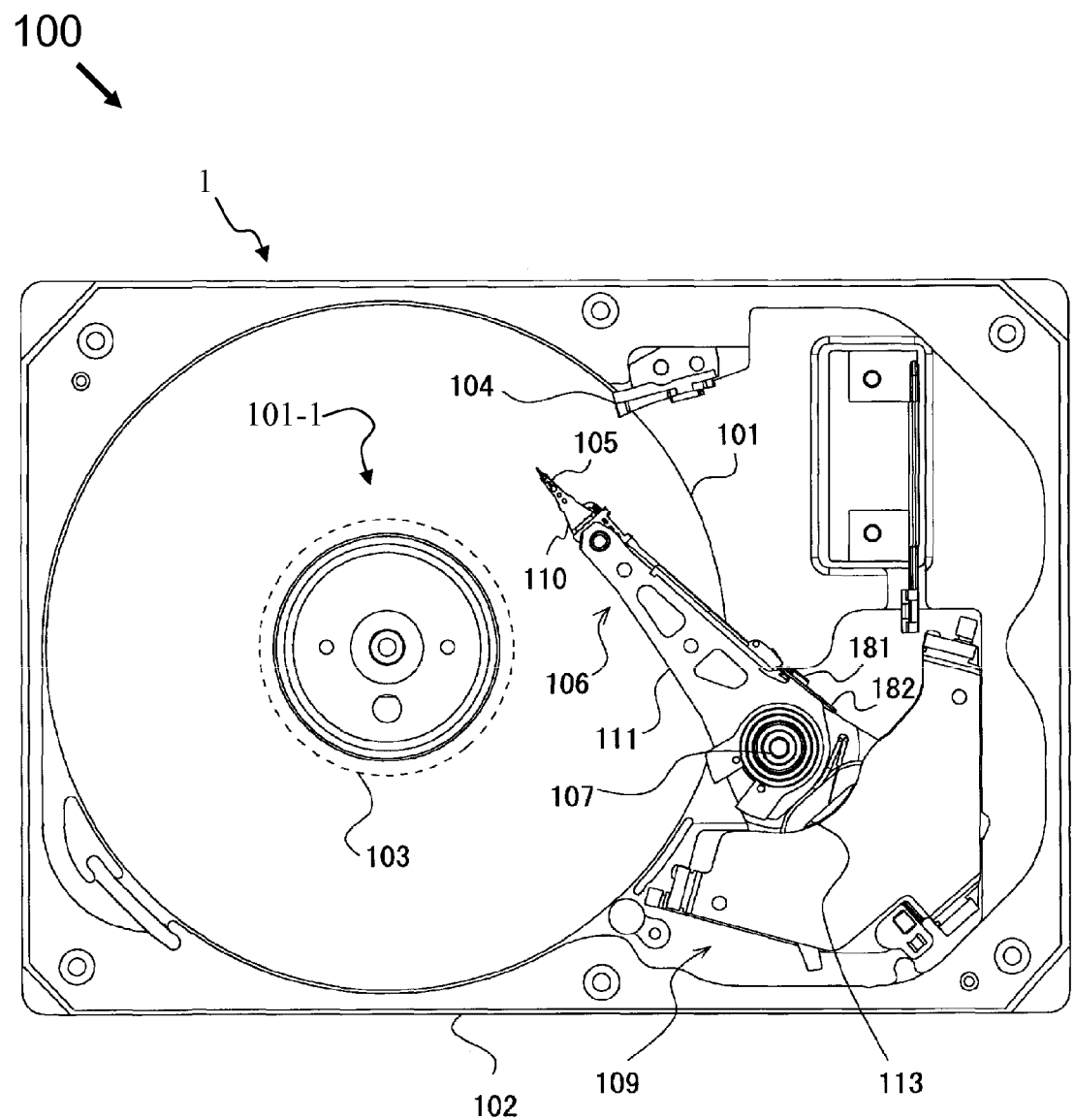
FIG. 1 is a top view showing the arrangement of components within the interior of a hard-disk drive (HDD) with the disk-enclosure (DE) cover removed, in accordance with one or more embodiments of the present invention.

The drawings referred to in this description should not be understood as being drawn to scale except if specifically noted.

DESCRIPTION OF EMBODIMENTS

Reference will now be made in detail to the alternative embodiments of the present invention. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following description of embodiments of the present invention, numerous specific details are set forth in order to provide a thorough understanding of the present invention. However, it should be noted that embodiments of the present invention may be practiced without these specific details. In other instances, well known methods, procedures, and components have not been described in detail as not to unnecessarily obscure embodiments of the present invention. Throughout the drawings, like components are denoted by like reference numerals, and repetitive descriptions are omitted for clarity of explanation if not necessary. Description of Embodiments of the Present Invention for a Magnetic-Recording Head with a First Thermal Fly-Height Control Element and an Embedded Contact Sensor Element Configurable as a Second Thermal Fly-Height Control Element With relevance to embodiments of the present invention, as is known in the art, a contact sensor element (CSE) that detects contact between a magnetic-recording disk and a head-slider may be disposed on the head-slider, or alternatively, on the actuator to which the head-slider is attached. The contact between the head-slider and the magnetic-recording disk may be continuously monitored by the CSE. The hard-disk drive (HDD) can respond to contact between the magnetic-recording head and the magnetic-recording disk at the location where the contact occurs on the magnetic-recording disk. In a first example, the HDD can control the fly-height in response to the position of the magnetic-recording head and the location in a track of the magnetic-recording disk associated with the contact by increasing the fly-height and suspending the write process at such a location; or, in an alternative example, as in glide-height testing of a magnetic-recording disk, the HDD can maintain contact between the magnetic-recording head and the magnetic-recording disk at the location where the contact occurs on the magnetic-recording disk. Thus, as in the first example, the fly-height margin between the head-slider and the magnetic-recording disk can be decreased by continuously monitoring contact between the head-slider and the magnetic-recording disk. As a result, the fly-height in a read process and a write process can be reduced.

With further relevance to embodiments of the present invention, as is known in the art, in a structure including the CSE disposed on the head-slider, or alternatively, the actuator, the arm-electronics (AE) module includes a receiver circuit, which is a contact sensor circuit (CSC), in the CSE. Unlike the controller and the channel circuits, the AE module is positioned near the actuator and the head-slider in the disk enclosure (DE). The contact sensitivity of the contact sensor that includes the CSE and the CSC can be high. In the detection of contact between the head-slider and the magnetic-recording disk, the CSE must be positioned in the vicinity of the lowest point, which is a point closest to the magnetic-recording disk in the air-bearing surface (ABS) of the magnetic-recording head of the head-slider, in order to detect contact with high sensitivity. Therefore, one effective location for placement of the CSE may be at the location that protrudes the most whilst taking into account recession, which results from differences in removal rate from polishing processes applied to the ABS in fabrication; on the other hand, another effective location for placement of the CSE may be at the location where contact occurs at the tip of the protruding shape in the TFC heater element.

However, the recession profile of the ABS and the protrusion shape of the TFC heater element differ from head-slider to head-slider. In addition, ambient temperature changes usually also have an affect on the protrusion shape, causing the protrusion shape to change. Consequently, to guarantee the sensitivity of the contact sensor, embodiments of the present invention continuously position an embedded contact sensor element (ECSE) at the lowest point independent of the individual differences between head-sliders and the ambient temperature difference. As used herein, the term of art "embedded contact sensor element," or "ECSE," is a CSE embedded in the structure of the magnetic-recording head.

In accordance with embodiments of the present invention, a HDD includes a head-slider for accessing the magnetic-recording disk, a first heater element which thermally expands a portion of the head-slider to adjust the distance from the magnetic-recording disk, a second heater element which has a heater function and simultaneously plays the role of a ECSE for detecting contact between the head-slider and the magnetic-recording disk, and an AE module for amplifying the magnetic read-back signal from the magnetic-recording head of the head-slider. In addition to the function of amplifying the magnetic read-back signal, the AE module has the function of supplying power to the first heater element and the second heater element, and the function for measuring the resistances of the first heater element and the second heater element.

In accordance with embodiments of the present invention, the power supply function and the resistance measuring function of the AE module satisfy the following three relationships:

1) a first maximum power that can be supplied to the first heater element is greater than a second maximum power which can be supplied to the second heater element;
2) the second maximum power that can be supplied to the second heater element is greater than a first heater-element power increment, in other words, a step size in power, supplied to the first heater element; and
3) a resistance measurement resolution of the second heater element is higher, in other words, can be measured with greater accuracy, than the resistance measurement resolution of the first heater element.

Thus, in accordance with embodiments of the present invention, the following effects are produced by satisfying the above relationships. First, the power which can be supplied to the first heater element is sufficiently large, namely, larger than the power which can be supplied to the second heater element. By obtaining the adjusted clearance for sufficient fly-height at the first heater element alone, the fly-height for the write element and read element can be simply controlled by only the first heater element. Next, for the second heater element, the power which can be supplied to the second heater element is sufficiently small, namely, smaller that the power which can be supplied to the first heater element. The AE module can be prevented from producing excessive heat generation; and, therefore, the reliability of the AE module can be increased. In addition, the manufacturability can be simplified without excessively increasing the area, which may be used for heat-sinking, of the AE module to prevent overheating of the AE module. Also, for the second heater element to generate an amount of protrusion sufficient to produce the point nearest to the recording surface of the magnetic-recording disk at the lowest point of the ABS, power that is supplied to the second heater element has some finite value; namely, power that is supplied to the second heater element has a value larger than the step size of power supplied to the first heater element, which may be referred to herein as the first heater-element power increment. Moreover, the sensitivity of the ECSE as a contact sensor is guaranteed in a wide temperature range independent of the individual differences between magnetic-recording heads and ambient temperature differences. In addition, satisfactory resistance measurement accuracy can be maintained in the ECSE by having a sufficiently high resistance measurement resolution for the second heater element that is higher than the resistance measurement resolution for the first heater element; as used herein, higher resolution of a resistance measurement for the second heater element means that smaller resistance changes can be measured in the second heater element than in the first heater element.

Embodiments of the present invention include a magnetic-recording head with a first TFC element and an ECSE configurable as a second TFC element. The magnetic-recording head includes a write element, a read element, a first heater element, and an ECSE. The write element is configured for writing data to a magnetic-recording disk. The read element is configured for reading back data from the magnetic-recording disk. The first heater element is configured as a first TFC element to coarsely adjust a fly-height of the magnetic-recording head with respect to the magnetic-recording disk. The ECSE is configured to detect a contact with the magnetic-recording disk, and configured to function as a second heater element that is configured as a second TFC element to finely adjust the fly-height. The first heater element is configured with a first stroke-length larger than a second stroke-length of the second heater element for adjusting the fly-height. As used herein, the term of art, "stroke-length," refers to the maximum protrusion of an ABS at the magnetic-recording head portion of a head-slider due to application of power to a heater element.

In accordance with one embodiment of the present invention, the ECSE is disposed in close proximity to an air-bearing surface of the magnetic-recording head.

In accordance with another embodiment of the present invention, the ECSE is disposed in closer proximity to the write element than the read element.

In accordance with another embodiment of the present invention, the first stroke-length of the first heater element is about 10 nm.

In accordance with another embodiment of the present invention, the second stroke-length of the second heater element is about 0.5 nm.

In accordance with another embodiment of the present invention, the ECSE is configured to provide sensitivity for detection of a head-disk-interference (HDI) event that causes an increase of temperature of the ECSE on an order of at least about 1%.

Embodiments of the present invention also include an arm-electronics module for the magnetic-recording head with the first TFC element and the ECSE configurable as the second TFC element. The arm-electronics module includes a substrate, a write-signal amplifier, a read-signal amplifier, a first heater-element power supply, and a second heater-element power supply. The write-signal amplifier is configured to amplify a write signal sent to a write element of the magnetic-recording head. The read-signal amplifier is configured to amplify a read-back signal sent from a read element of the magnetic-recording head. The first heater-element power supply is configured to provide power in at least one first heater-element power increment to the first heater element of the magnetic-recording head. The second heater-element power supply is configured to provide power to the ECSE of the magnetic-recording head. The write-signal amplifier, the read-signal amplifier, the first heater-element power supply and the second heater-element power supply are fabricated on the same substrate of the AE module.

In accordance with one embodiment of the present invention, the arm-electronics module further includes a control unit configured to supply control signals to the write-signal amplifier, the read-signal amplifier, the first heater-element power supply and the second heater-element power supply.

In accordance with another embodiment of the present invention, the arm-electronics module further includes a first-heater element electrical-resistance measurement circuit for the first heater element; and, the first-heater element electrical-resistance measurement circuit is fabricated on the same substrate of the AE module.

In accordance with another embodiment of the present invention, the arm-electronics module further includes the control unit also configured to supply control signals to first-heater element electrical-resistance measurement circuit.

In accordance with an embodiment of the present invention, the arm-electronics module further includes a second-heater element electrical-resistance measurement circuit for the ECSE; and, the second-heater element electrical-resistance measurement circuit is fabricated on same substrate of the AE module.

In accordance with an embodiment of the present invention, the second-heater element electrical-resistance measurement circuit for the ECSE is configured to measure electrical-resistance changes of the ECSE on an order of about 0.1%.

In accordance with an embodiment of the present invention the arm-electronics module further includes the control unit also configured to supply control signals to second-heater element electrical-resistance measurement circuit.

In accordance with an embodiment of the present invention, the second heater-element power supply is configured to supply a second maximum power to the ECSE, which is configured as a second heater element, that is less than a first maximum power supplied to the first heater element by the first heater-element power supply, but greater than the first heater-element power increment supplied to the first heater element by the first heater-element power supply.

In accordance with an embodiment of the present invention, the arm-electronics module includes a monolithic integrated circuit.

Embodiments of the present invention include a HDD. The HDD includes at least one magnetic-recording disk, at least one magnetic-recording head with a first TFC element and an ECSE configurable as a second TFC element, and an AE module for the magnetic-recording head with the first TFC element and the ECSE configurable as the second TFC element. The magnetic-recording head includes a write element, a read element, a first heater element, and an ECSE. The write element is configured for writing data to the magnetic-recording disk. The read element is configured for reading back data from the magnetic-recording disk. The first heater element is configured as a first TFC element to coarsely adjust a fly-height of the magnetic-recording head with respect to the magnetic-recording disk. The ECSE is configured to detect a contact with the magnetic-recording disk, and configured to function as a second heater element that is configured as a second TFC element to finely adjust the fly-height. The first heater element is configured with a first stroke-length larger than a second stroke-length of the second heater element for adjusting the fly-height. The magnetic-recording head is configured to read data from, and to write data to, the magnetic-recording disk. The arm-electronics module includes a substrate, a write-signal amplifier, a read-signal amplifier, a first heater-element power supply, and a second heater-element power supply. The write-signal amplifier is configured to amplify a write signal sent to a write element of the magnetic-recording head. The read-signal amplifier is configured to amplify a read-back signal sent from a read element of the magnetic-recording head. The first heater-element power supply is configured to provide power in at least one first heater-element power increment to the first heater element of the magnetic-recording head. The second heater-element power supply is configured to provide power to the ECSE of the magnetic-recording head. The write-signal amplifier, the read-signal amplifier, the first heater-element power supply and the second heater-element power supply are fabricated on the same substrate of the AE module.

Embodiments of the present invention are further described below. By way of example, embodiments of the present invention are described in the environment of a HDD, without limitation thereto, as other types of disk drives that incorporate embodiments of the present invention are also within the spirit and scope of embodiments of the present invention. Embodiments of the present invention, as described above and subsequently described, for the magnetic-recording head with a first TFC element and an ECSE configurable as a second TFC element, and for the arm-electronics module for the magnetic-recording head with a first TFC element and an ECSE configurable as a second TFC element are incorporated herein within the environment of the HDD, and are, therefore, also within the spirit and scope of embodiments of the present invention for the HDD.

With reference now to FIG. 1, in accordance with one or more embodiments of the present invention, a top view 100 is shown of the interior of HDD 1 with the disk-enclosure (DE) cover removed. The mechanical structural elements of HDD 1 are accommodated in a disk-enclosure (DE) base 102. The structural elements in the DE base 102 are controlled by a control circuit on a printed circuit board (PCB) fixed outside of the DE base 102. HDD 1 includes a magnetic-recording disk 101, which is the disk for storing data, and a head-slider 105 for accessing the data stored on the magnetic-recording disk 101. As used herein, "access" is a term of art that refers to operations in seeking a data track of a magnetic-recording disk and positioning a magnetic-recording head on the data track for both reading data from, and writing data to, a magnetic-recording disk. The head-slider 105 includes a magnetic-recording head for writing the user data to, and/or reading the user data from, the magnetic-recording disk 101, and a slider, which includes the magnetic-recording head formed on a distal end of the slider.

A rotary actuator 106 supports the head-slider 105 and moves the head-slider 105 above the rotating magnetic-recording disk 101 by a swinging motion having a center of rotation at a pivot shaft 107. A voice-coil motor (VCM) 109, as the drive mechanism, drives the rotary actuator 106.

The rotary actuator 106 is disposed with each structural member joining a suspension 110, an arm 111, and a voice coil 113 from the front edge in the lengthwise direction, where the head-slider 105 is disposed. The assembly of the suspension 110 and the head-slider 105 is referred to as a head-gimbal assembly (HGA). In addition, the assembly of the rotary actuator 106 and the head-slider 105 is referred to as the head-stack assembly (HSA).

A spindle motor (SPM) 103 fixed to the DE base 102 rotates the magnetic-recording disk 101 at a specified angular speed. By balancing the pressure caused by the viscosity of the air between the ABS of the slider in proximity to the recording surface of the rotating magnetic-recording disk 101 and the load applied in the direction of the magnetic-recording disk 101 by the suspension 110, the head-slider 105 flies in proximity with a recording surface 101-1 of the magnetic-recording disk 101. The signal to and from the magnetic-recording head of the head-slider 105 is amplified by an AE module 181, which is close to the pivot shaft 107. The AE module 181 is mounted on a PCB 182.

When the head-slider 105 is not accessing, the rotary actuator 106 stops on a load/unload ramp 104 disposed at the outside of the magnetic-recording disk 101. However, embodiments of the present invention may, or may not, include the load/unload ramp 104 and can also be applied to both a HDD where the rotary actuator 106 and the HGA, when not accessing, move to an inner peripheral region of a magnetic-recording disk, or alternatively, to an outer peripheral region of a magnetic-recording disk, which are referred to as "landing zones" on the magnetic-recording disk 101.

In the descriptions of the HSA and the HGA, described herein, the direction that is perpendicular to the pivot shaft 107 and connects the respective centers of the pivot shaft 107 and the head-slider 105 is referred to as the front-back direction. This direction is a direction that is parallel to the recording surface of the magnetic-recording disk 101. Furthermore, the position where the head-slider 105 is affixed is in front of the position of the pivot shaft 107. In the rotary actuator 106, the suspension 110 is affixed in front of the arm 111; and, the voice coil 113 is positioned behind the arm 111.

As used herein, the direction parallel to the pivot shaft 107 is referred to as the up-down direction. An up-down direction also lies parallel to the direction of the normal to the recording surface of the magnetic-recording disk 101; and, as used herein, an up-down direction may be either directed towards or away from a recording surface of the magnetic-recording disk 101. In a structure where the rotary actuator 106 includes a plurality of HGAs, the plurality of HGAs is arranged in the up-down direction. The head-slider 105 is positioned between the suspension 110 and the magnetic-recording disk 101. Looking at the HGA, this position is defined as a higher position for the suspension 110 than the head-slider 105. In addition, the direction perpendicular to the pivot shaft 107 and perpendicular to the front-back direction is referred to as the left-right direction. The oscillation direction of the rotary actuator 106 on the pivot shaft 107 is the left-right direction, which is about parallel to a radial direction of the magnetic-recording disk 101.

Figure 2:
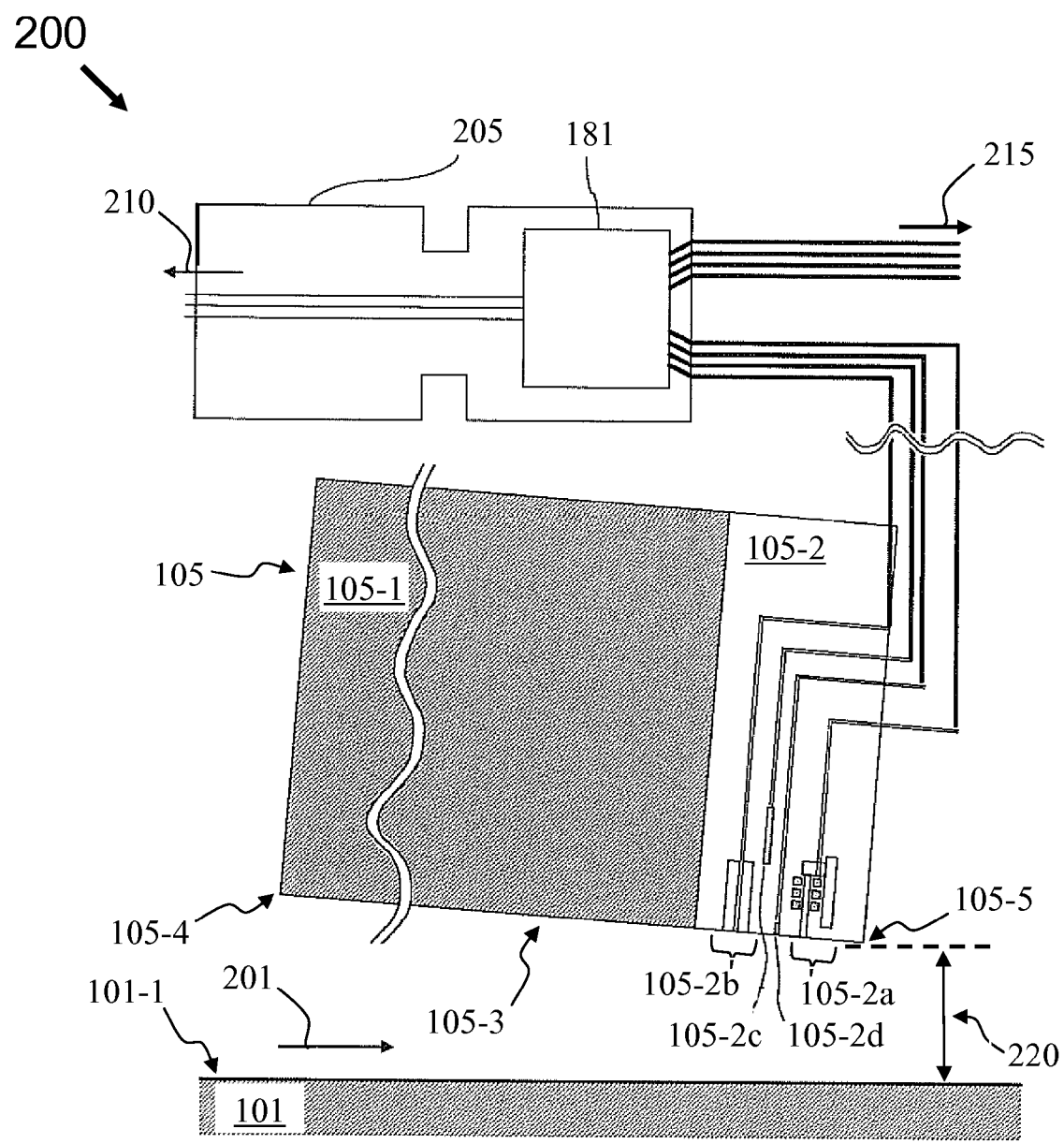
FIG. 2 is a schematic diagram of the electrical circuits in the arm-electronics (AE) module, a flexible printed circuit (FPC), and the magnetic-recording head, and illustrates the configuration of a head-slider including the magnetic-recording head in flight over a magnetic-recording disk, in accordance with one or more embodiments of the present invention.

With reference now to FIG. 2, in accordance with one or more embodiments of the present invention, a schematic diagram 200 is shown of the electrical circuits in the AE module 181, a flexible printed circuit (FPC) 205, and a magnetic-recording head 105-2. FIG. 2 also illustrates the configuration of the head-slider 105, including a slider 105-1 and the magnetic-recording head 105-2, in flight over the recording surface 101-1 of the magnetic-recording disk 101. As described above, the head-slider 105 includes an ABS 105-3 that is a portion of the disk-facing surface of the head-slider 105, which is configured to develop a thin film of viscous air on which the head-slider 105 rides over the magnetic-recording disk 101. As shown in FIG. 2, a leading edge 105-4 at the front end of the head-slider 105 encounters an airflow 201 generated by the rotation of the magnetic-recording disk 101 in about a front-back direction; and, recessed portions (not shown) of the disk-facing surface of the head-slider 105 produce a negative pressure that causes a trailing edge 105-5 at the back end of the head-slider 105 where the magnetic-recording head 105-2 is located to be disposed in proximity to the recording surface 101-1 of the magnetic-recording disk 101. The minimum spacing between the head-slider 105 and the magnetic-recording disk is referred to as a fly-height 220 of the head-slider. As shown in FIG. 2, neglecting the effects of protrusion caused by TFC elements in the magnetic-recording head 105-2, the fly-height 220 is defined by minimal distance between the magnetic-recording head 105-2 at the trailing edge 105-5 of the head-slider 105 and the recording surface of the magnetic-recording disk 101 along about an up-down direction. The magnetic-recording head includes a write element 105-2a, a read element 105-2b, a first heater element 105-2c, and ECSE 105-2d. In accordance with one or more embodiments of the present invention, the first heater element 105-2c is configured as a first TFC element to coarsely adjust fly-height of the magnetic-recording head 105-2 with respect to the magnetic recording disk 101 by causing the ABS 105-3 at a location of the magnetic-recording head 105-2 to protrude towards the recording surface 101-1 of the magnetic-recording disk 101 along about an up-down direction. Moreover, in accordance with one or more embodiments of the present invention, the ECSE 105-2d, which is configured to detect a contact with the magnetic-recording disk 101, is also configured to function as a second heater element, which is configured as a second TFC element to further finely adjust the fly-height by causing the ABS 105-3 at the location of the ECSE 105-2d in the magnetic-recording head 105-2 to further protrude towards the recording surface 101-1 of the magnetic-recording disk 101 along about an up-down direction, as is subsequently described in greater detail.

With further reference to FIG. 2, in accordance with one or more embodiments of the present invention, the AE module 181, which includes an integrated circuit (IC) for the magnetic-recording-head, is an encapsulated IC disposed in a package. Typically, the AE module 181 is disposed in the vicinity of the pivot shaft 107 of the rotary actuator 106, or in proximity to the FPC 205, which is attached to the rotary actuator 106. A portion of the AE module 181 is electrically connected to a magnetic-recording head in one head-slider, for example, magnetic-recording head 105-2 in head-slider 105, or to magnetic-recording heads in two or more head-sliders, respectively, as indicated by arrow 215 for lines connected to other magnetic-recording heads. In addition, the other portion of the AE module 181 is connected to a read/write (R/W) channel 305 (see FIG. 3), as indicated by arrow 210 for lines connected to R/W channel 305, which is another IC disposed on the PCB mounted on the outside of the DE base 102. The AE module 181 selects a head-slider, for example, head-slider 105, for accessing a magnetic-recording disk, for example, magnetic-recording disk 101, from a plurality of head-sliders and amplifies the read-back signal, or the write signal, in accordance with control data that is received from a hard-disk controller/microprocessor unit (HCD/MPU), which is also mounted on the PCB secured to the outside of the DE base 102. In addition, the R/W channel 305 code-modulates the write data and outputs the data to the AE module 181, detects the data from the read-back waveform, which may have been read back from the magnetic-recording disk 101, that is the output signal of the AE module 181, and code-demodulates the read-back signal. For example, in a read process, the R/W channel 305 extracts data from the read-back signal supplied from the AE module 181 and decodes the data. In addition, in a write process, the R/W channel 305 code-modulates the write data, converts the code-modulated data into a write signal, and supplies the signal to the AE module 181.

With further reference to FIG. 2, in accordance with one or more embodiments of the present invention, in order to ensure the functions described above, the electrical connections between the write element 105-2a and the read element 105-2b are provided by lines between the AE module 181 and the head-slider 105. In addition, at least a first heater element 105-2c is provided in order to provide the TFC function. The electrical connections for supplying current to the ECSE 105-2d are provided in order to provide the ECS function. In accordance with embodiments of the present invention, the current supplied to the ECSE 105-2d has the two functions: one for matching current to the ECSE 105-2d; and, another for supplying power in order to use the ECSE 105-2d as a second heater element, as next described.

With further reference to FIG. 2, in accordance with one or more embodiments of the present invention, the ECSE 105-2d is a resistive element. Thus, in one embodiment of the present invention, the resistance, or alternatively a change in the resistance, of the ECSE 105-2d is measured at a constant current, or alternatively, at a constant voltage; and, the resistance-change value is measured from the voltage change, or alternatively, the current change, respectively, through the ECSE 105-2d. The resistance of the ECSE 105-2d is changed by contact between the magnetic-recording head 105-2 and the magnetic recording disk, as occurs with a HDI event. Generally, the resistance of the ECSE 105-2d increases with an increase in temperature caused by the contact. Thus, the CSC monitors the resistance of the ECSE 105-2d and senses resistance changes in the ECSE 105-2d caused by contact between the magnetic-recording head 105-2 and the magnetic recording disk. The resistance of the resistive element of the ECSE 105-2d changes when the magnetic-recording head 105-2 is in contact with the magnetic-recording disk 101. Contact between the head-slider 105 and the magnetic-recording disk 101 can be sensed by measuring this change in resistance. Thus, in accordance with one or more embodiments of the present invention, to sense contact accurately and with high sensitivity, the ECSE 105-2d is formed on the head-slider 105 in the magnetic-recording head 105-2.

With further reference to FIG. 2, in accordance with one or more embodiments of the present invention, the ECSE 105-2d functions as a second heater element for use in the TFC in the ECSE 105-2d. Thus, the fly-height is coarsely adjusted by the first heater element 105-2c. Moreover, since the ECSE 105-2d may be used as a second heater element, in accordance with embodiments of the present invention, the ECSE 105-2d can be used in the fine adjustment of the fly-height of the portion of the magnetic-recording head 105-2 where the ECSE 105-2*d* is disposed in proximity to the ABS 105-3 of the head-slider 105.

Figure 3:
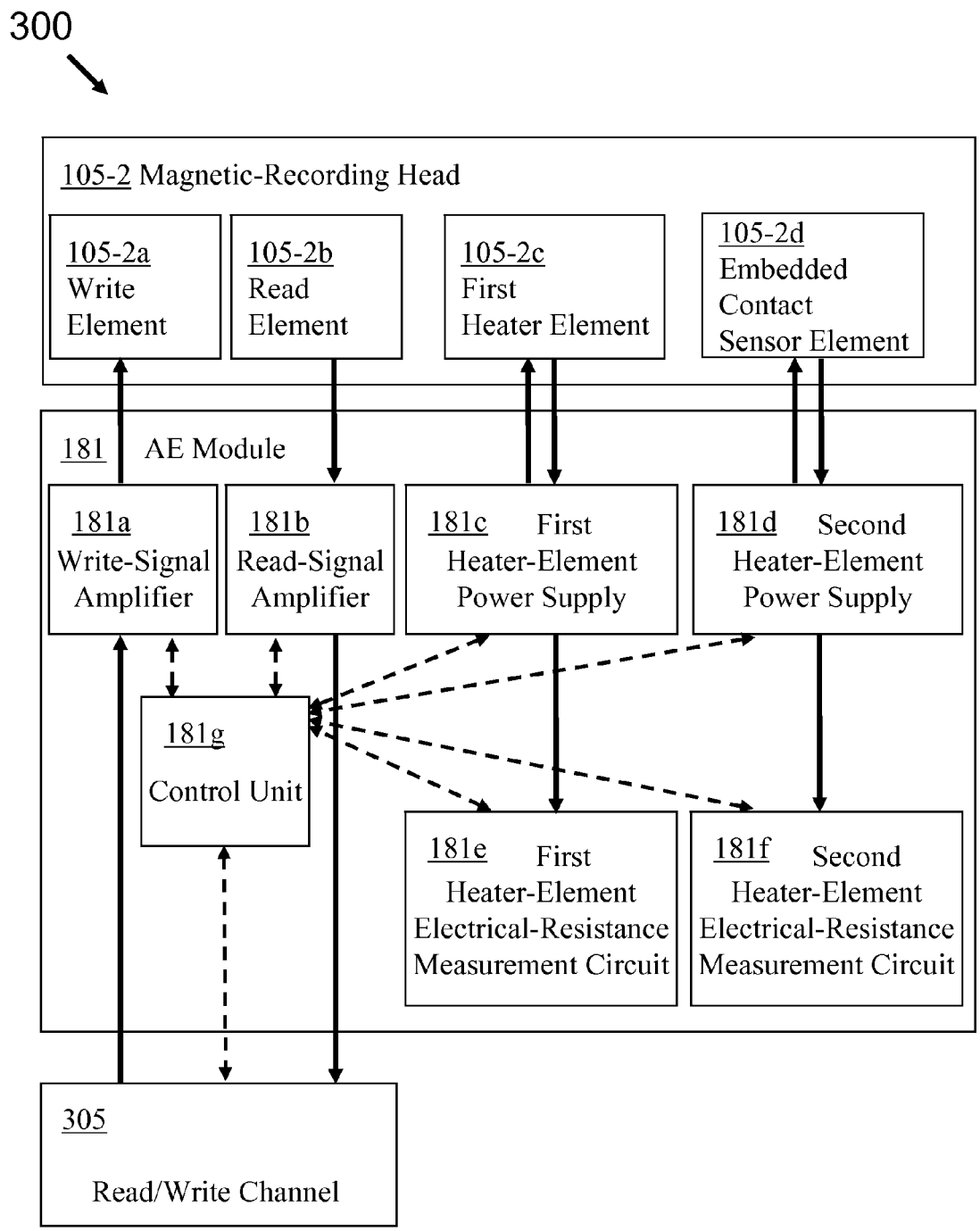
FIG. 3 is a block diagram of the electrical circuits in the AE module and the magnetic-recording head illustrating signal flow between the various blocks, in accordance with one or more embodiments of the present invention.

With reference now to FIG. 3, in accordance with one or more embodiments of the present invention, a block diagram 300 is shown of the electrical circuits in the AE module 181 and the magnetic-recording head 105-2 that illustrates signal flow between the various component blocks of the AE module 181 and the magnetic-recording head 105-2. In accordance with embodiments of the present invention, the AE module includes a substrate (not shown), a write-signal amplifier 181*a*, a read-signal amplifier 181*b*, a first heater-element power supply 181*c*, and a second heater-element power supply 181*d*. The write-signal amplifier 181*a* is configured to amplify a write signal sent to the write element 105-2*a* of the magnetic-recording head 105-2. The read-signal amplifier 181*b* is configured to amplify a read-back signal sent from the read element 105-2*b* of the magnetic-recording head 105-2. The first heater-element power supply 181*c* is configured to provide power in at least one first heater-element power increment to the first heater element 105-2*c* of the magnetic-recording head 105-2. The second heater-element power supply 181*d* is configured to provide power to the ECSE 105-2*d* of the magnetic-recording head 105-2, when the ECSE 105-2*d* functions as a second heater element of the magnetic-recording head 105-2; such power may also be provided to the ECSE 105-2*d* in at least one second heater-element power increment. Thus, the first heater-element power supply 181*c* may be configured to increase power in a step-wise fashion to the first heater element 105-2*c* such that each step-wise increase corresponds to a heater-element power increment.

With further reference to FIG. 3, in accordance with embodiments of the present invention, the AE module 181 may further include a first-heater element electrical-resistance measurement circuit 181*e* for the first heater element 105-2*c*, a second-heater element electrical-resistance measurement circuit 181*f* for the ECSE 105-2*d*, and a control unit 181*g*. The control unit 181*g* is configured to supply control signals to the write-signal amplifier 181*a*, the read-signal amplifier 181*b*, the first heater-element power supply 181*c* and the second heater-element power supply 181*d*, the first-heater element electrical-resistance measurement circuit 181*e*, and the second-heater element electrical-resistance measurement circuit 181*f* for the ECSE 105-2*d* when used as a second heater element. The write-signal amplifier 181*a*, the read-signal amplifier 181*b*, the first heater-element power supply 181*c* and the second heater-element power supply 181*d* are fabricated on the same substrate of the AE module 181; similarly, the first-heater element electrical-resistance measurement circuit, the second-heater element electrical-resistance measurement circuit, and the control unit may be fabricated on the same substrate of the AE module 181. Thus, in accordance with an embodiment of the present invention, the AE module 181 includes a monolithic integrated circuit. As shown in FIG. 3, the heavy dark arrows correspond to primary signals sent between the main blocks of the magnetic-recording head 105-2, the AE module 181, and the R/W channel 305; the lighter dashed double-headed arrows correspond to control signals sent back and forth between the main blocks of the AE module 181, and the R/W channel 305. These control signals may be sent in response to signals received by the R/W channel 305 from the HDC/MPU.

With further reference to FIG. 3, in accordance with embodiments of the present invention, the AE module 181 supplies power to a heater element of a selected head-slider, for example, head slider 105, in accordance with the control data, or control signals, and control functions, performing the function of a power supply adjusting circuit for adjusting the amount of power to a heater element, for example, first heater element 105-2*c*, or alternatively, ECSE 105-2*d* when performing as a second heater element. In addition, the AE module 181 has a contact detection function which uses the ECSE 105-2*d* and monitors the contact between the head-slider 105 and the magnetic-recording disk 101 to detect contact. The structure in the AE module 181 for detecting contact between the head-slider 105 and the magnetic-recording disk 101 includes a CSC and a contact determination unit. The CSC determines the contact sensitivity of the ECSE 105-2*d* based on the signals from the ECSE 105-2*d* in the magnetic-recording head 105-2 of the head-slider 105. Generally, a HDD, for example, HDD 1, may include a plurality of head-sliders, of which head-slider 105 is an example, an AE module 181, and a CSC corresponding to each head-slider, or a shared CSC for all, or a portion, of the head-sliders. In accordance with an embodiment of the present invention, the contact determination unit is shared by all of the head-sliders. Thus, the circuit scale can be made smaller when compared to an AE module that includes dedicated contact determination units for each head-slider.

With further reference to FIG. 3, in accordance with one or more embodiments of the present invention, the first heater element 105-2*c* and the ECSE 105-2*d*, when performing as the second heater element, satisfy the following relationships:

1) the maximum power (Pmax1) that can be supplied to the first heater element 105-2*c* is greater than the maximum power (Pmax2) that can be supplied to the second heater element, ECSE 105-2*d*; for example, Pmax1=100 milliwatt (mW), and Pmax2=5 mW;
2) the maximum power (Pmax1) which can be supplied to the second heater element, identified with ECSE 105-2*d*, is greater than the step size (Pstep1) of the power supplied to the first heater element 105-2*c*; where the step size (Pstep1) is identified with first heater-element power increment;
3) the resistance measurement resolution (Rres2) of the second heater element, identified with ECSE 105-2*d*, is higher than the resistance measurement resolution (Rres1) of the first heater element 105-2*c*; for example, Rres1=1%; and Rres2=0.1%.

Figure 4:
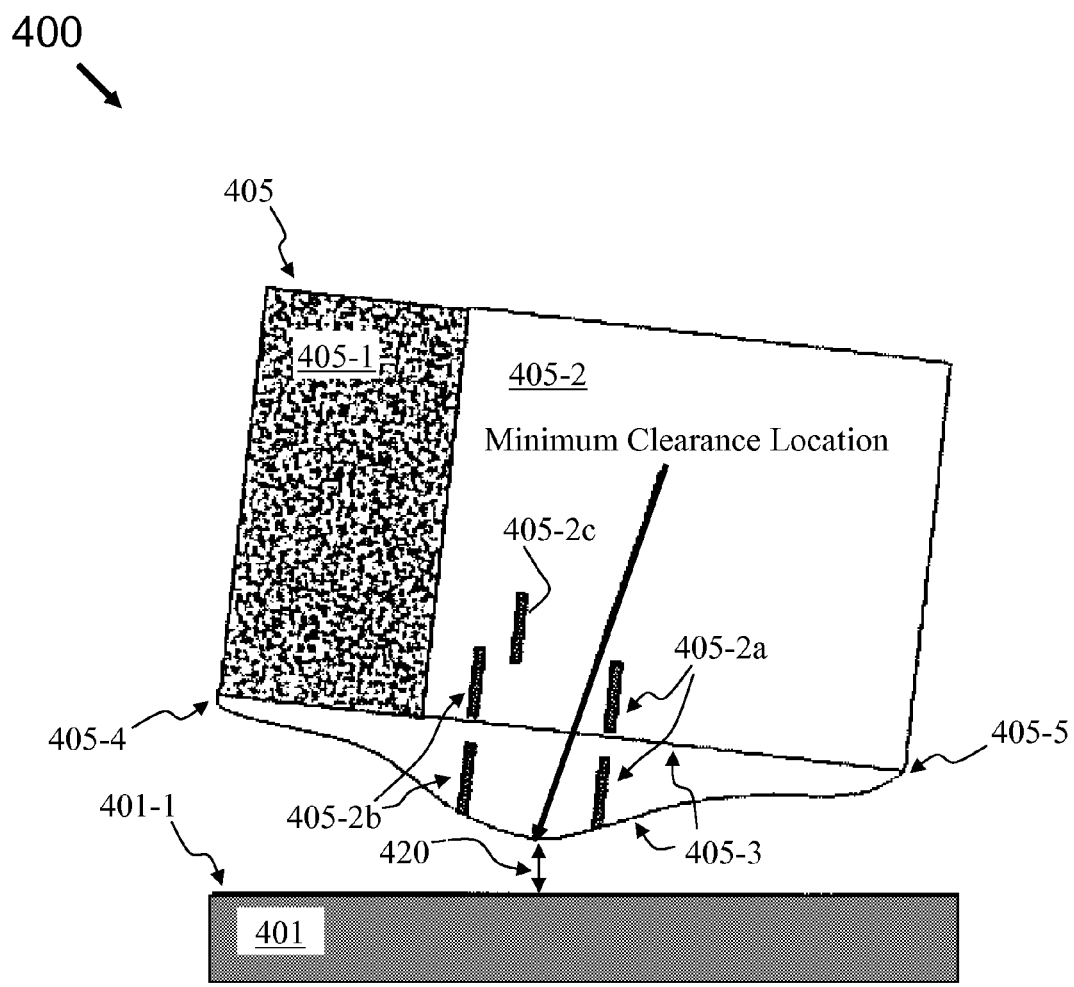
FIG. 4 is a cross-sectional schematic view of a head-slider including the magnetic-recording head illustrating the relationship of various elements of the magnetic-recording head in flight over a magnetic-recording disk with heating of just a single heater element, as known in the prior art.

With reference now to FIG. 4, with relevance to embodiments of the present invention, a structure of a TFC element, known from the prior art, a heater element 405-2*c* in a head-slider 405 is described; heater element 405-2*c* is similar to first heater element 105-2*c* previously described. FIG. 4 is a schematic cross-sectional view 400 of the structure of a prior-art head-slider 405. The head-slider 405 includes a slider 405-1 and a magnetic-recording head 405-2. The length of the slider 405-1 has been truncated; and, leading edge 405-4 and trailing edge 405-5 of the head-slider 405 are shown for purposes of simplifying the discussion. The prior-art magnetic-recording head 405-2 includes a write element 405-2*a*, a read element 405-2*b*, and heater element 405-2*c*. The head-slider 405 flies above a magnetic-recording disk 401 in proximity to a recording surface 401-1 of the magnetic-recording disk 401. The drawing shows the structure of the head-slider 405 corresponding to conventional TFC. The heater element 405-2*c* is provided in the vicinity of the write element 405-2*a* and the read element 405-2*b* of the magnetic-recording head 405-2. The AE module 181 supplies power to the heater element 405-2*c* of the selected head-slider 405 in accordance with the control data; and, the AE module 181 functions as the power supply adjusting circuit for adjusting the amount of power to the heater element 405-2*c*. The heater element 405-2*c* expands and causes the ABS 405-3 at the magnetic-recording head 405-2 to protrude by the action of the heat generated by the supplied power to adjust a fly-height 420 between the magnetic-recording head 405-2 and the recording surface 401-1 of the magnetic-recording disk 401. The heater element 405-2c is the fly-height actuator for adjusting the fly-height 420 between the magnetic-recording head 405-2 and the recording surface 401-1 of the magnetic-recording disk 401. As shown in FIG. 4, as a result of heating the magnetic-recording head 405-2, ABS 405-3, the write element 405-2a, and the read element 405-2b are displaced downwards towards the recording surface 401-1 of the magnetic-recording disk 401, as indicated in FIG. 4 by the ABS 405-3 with the inverted bell-shaped profile, away from the position that the ABS 405-3, the write element 405-2a, and the read element 405-2b would occupy in the absence of heating, as indicated in FIG. 4 by the ABS 405-3 with the flat profile. Moreover, a new minimum clearance is established between the magnetic-recording head 405-2 and the recording surface 401-1 of the magnetic-recording disk 401, which is no longer at the trailing edge 405-5 of the head-slider 405. Thus, the fly-height 420 is reduced compared to a fly-height at the trailing edge 405-5 bringing the write element 405-2a, and the read element 405-2b into closer proximity to the recording surface 401-1 of the magnetic-recording disk 401, which allows for higher aerial recording density (AD) in magnetic recording, as is known in the TFC art. On the other hand, embodiments of the present invention provide for an even smaller fly-height to enable a yet still higher AD in magnetic recording, as is next described.

Figure 5:
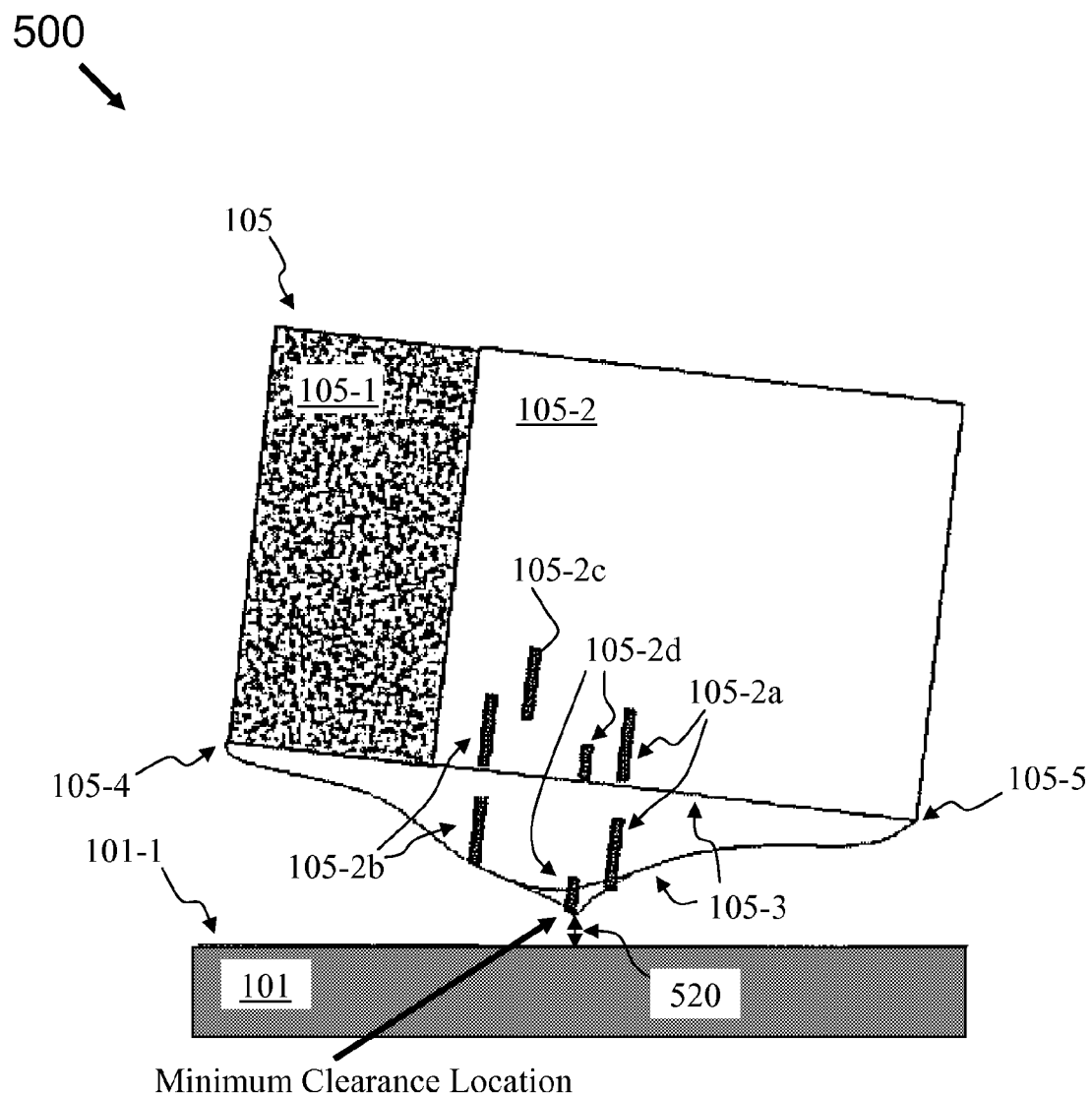
FIG. 5 is another cross-sectional schematic view of the head-slider including the magnetic-recording head illustrating the relationship of various elements of the magnetic-recording head in flight over a magnetic-recording disk with heating of both a first heater element and a second heater element that is an embedded contact sensor element, in accordance with one or more embodiments of the present invention.

With reference now to FIG. 5, in accordance with one or more embodiments of the present invention, another cross-sectional schematic view 500 is shown of the head-slider 105 including the slider 105-1 and the magnetic-recording head 105-2. FIG. 5 illustrates the relationship of various elements of the magnetic-recording head 105-2 in flight over the magnetic-recording disk 101 with heating of both the first heater element 105-2c and the second heater element that is the ECSE 105-2d. Similar to FIG. 4 and to facilitate comparison therewith, the length of the slider 105-1 has been truncated; and, the leading edge 105-4 and trailing edge 105-5 of the head-slider 105 are shown for purposes of simplifying the discussion. The magnetic-recording head 105-2 includes the write element 105-2a, the read element 105-2b, the first heater element 105-2c, and the ECSE 105-2d, which can be configured as a second heater element. The head-slider 105 flies above the magnetic-recording disk 101 in proximity to the recording surface 101-1 of the magnetic-recording disk 101. FIG. 5 shows the structure of the head-slider 105 corresponding to TFC elements and the ECSE 105-2d. A constant current, or alternatively, a constant voltage, may be applied to the ECSE 105-2d, as previously described in the discussion of AE module 181 shown in FIG. 3. The principle that if thermal energy is generated, then the resistance of a resistive element such as the ECSE 105-2d increases is used to detect contact with the magnetic-recording disk 101, as occurs upon an HDI event that is associated with a thermal asperity (TA), when the ECSE 105-2d comes into contact with the magnetic-recording disk 101. In accordance with an embodiment of the present invention, the ECSE 105-2d is also configured to provide sensitivity for detection of the HDI event that causes an increase of temperature of the ECSE 105-2d on an order of at least about 1%. Thus, to provide greater sensitivity to an HDI event, in accordance with one embodiment of the present invention, the ECSE 105-2d may be disposed in close proximity to the ABS 105-3 of the magnetic-recording head 105-2.

With further reference to FIG. 5, in accordance with one or more embodiments of the present invention, as described above, the ECSE 105-2d may also function as a second heater element for TFC use. In accordance with embodiments of the present invention, a fly-height 520 can be coarsely adjusted by the first heater element 105-2c, which is a first TFC element; and, when the ECSE 105-2d is used as the second heater element, which is a second TFC element, the fly-height 520 can be finely adjusted by the ECSE 105-2d. In accordance with embodiments of the present invention, the stroke-length that can adjust the amount of a second protrusion at the ABS 105-3 is greater than the protrusion associated with the step size of the first heater element, which may be set by a digital-to-analog convertor (DAC) for the first-heater element power supply 181c, as shown in FIG. 3. A fine adjustment of the protrusion may not be possible if a stroke-length due to expansion of the second heater element, ECSE 105-2d, is smaller than the protrusion associated with the step size of the first heater element 105-2c. On the other hand, the first stroke-length, which is the total protrusion producible by the first heater element 105-2c, is greater than the second stroke-length, which is the total protrusion producible by the ECSE 105-2d when configured as a second heater element, so that the first heater element 105-2c may provide coarse adjustment of the fly-height while the ECSE 105-2d when configured as a second heater element provides fine adjustment of the fly height. Thus, in accordance with another embodiment of the present invention, the first stroke-length of the first heater element may be about 10 nm; and, the second stroke-length of the second heater element may be about 0.5 nm. As shown in FIG. 5, as a result of heating the magnetic-recording head 105-2, the ABS 105-3, the write element 105-2a, the read element 105-2b, and the ECSE 105-2d are displaced downwards towards the recording surface 101-1 of the magnetic-recording disk 101, as indicated in FIG. 5 by the ABS 105-3 with the inverted bell-shaped profile, away from the position that the ABS 105-3, the write element 105-2a, the read element 105-2b, and the ECSE 105-2d would occupy in the absence of heating by the first heater element 105-2c, as indicated in FIG. 5 by the ABS 105-3 with the flat profile. Similar to FIG. 4, due to heating of the first heater element 105-2c, as a first TFC element, an initial minimum clearance may be established between the magnetic-recording head 105-2 and the recording surface 101-1 of the magnetic-recording disk 101, which is no longer at the trailing edge 105-5 of the head-slider 105. However, an additional amount of protrusion is provided by the second heater element, ECSE 105-2d as a second TFC element, which produces a new minimum clearance, which brings the ABS 105-3 into even closer proximity with the recording surface 101-1 of the magnetic-recording disk 101. Thus, the fly-height 520 is reduced compared to the fly-height 220 (see FIG. 2) at the trailing edge, as well as the fly-height 420 (see FIG. 4) due to the first heater element 105-2c alone, bringing the write element 105-2a, the read element 105-2b, and the ECSE 105-2d into closer proximity to the recording surface 101-1 of the magnetic-recording disk 101, which allows for higher AD in magnetic recording, as well as greater control of the fly-height 520. Moreover, as shown in FIGS. 2 and 5, in accordance with another embodiment of the present invention, the ECSE 105-2d may be disposed in closer proximity to the write element 105-2a than the read element 105-2b, which may increase the AD on writing data to the magnetic-recording disk 101.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A magnetic-recording head with a first thermal fly-height control element and an embedded contact sensor element configurable as a second thermal fly-height control element, said magnetic-recording head comprising:
   a write element configured for writing data to a magnetic-recording disk;
   a read element configured for reading back data from said magnetic-recording disk written by said write element;
   a first heater element configured as said first thermal fly-height control element to coarsely adjust a fly-height of said magnetic-recording head with respect to said magnetic recording disk; and
   said embedded contact sensor element configured to detect a contact with said magnetic-recording disk, and configured to function as said second heater element, said second heater element configured as said second thermal fly-height control element to finely adjust said fly-height;
   wherein said first heater element is configured to produce a first stroke-length larger than a second stroke-length of said second heater element for adjusting said fly-height.

2. The magnetic-recording head of claim 1, wherein said embedded contact sensor element is disposed in close proximity to an air-bearing surface of said magnetic-recording head.

3. The magnetic-recording head of claim 1, wherein said embedded contact sensor element is disposed in closer proximity to said write element than said read element.

4. The magnetic-recording head of claim 1, wherein said first stroke-length of said first heater element is about 10 nm.

5. The magnetic-recording head of claim 1, wherein said wherein said second stroke-length of said second heater element is about 0.5 nm.

6. The magnetic-recording head of claim 1, wherein said embedded contact sensor element is configured to provide sensitivity for detection of a head-disk-interference event that causes an increase of temperature of said embedded contact sensor element on an order of at least about 1%.

7. An arm-electronics module for a magnetic-recording head with a first thermal fly-height control element and an embedded contact sensor element configurable as a second thermal fly-height control element, said arm-electronics module comprising:
   a substrate;
   a write-signal amplifier configured to amplify a write signal sent to a write element of said magnetic-recording head;
   a read-signal amplifier configured to amplify a read-back signal sent from a read element of said magnetic-recording head;
   a first heater-element power supply configured to provide power in at least one first heater-element power increment to said first heater element of said magnetic-recording head;
   a second heater-element power supply configured to provide power to said embedded contact sensor element of said magnetic-recording head; and
   wherein said write-signal amplifier, said read-signal amplifier, said first heater-element power supply and said second heater-element power supply are fabricated on said substrate.

8. The arm-electronics module of claim 7, further comprising:
   a control unit configured to supply control signals to said write-signal amplifier, said read-signal amplifier, said first heater-element power supply and said second heater-element power supply.

9. The arm-electronics module of claim 7, further comprising:
   a first-heater element electrical-resistance measurement circuit for said first heater element, said first-heater element electrical-resistance measurement circuit fabricated on said substrate.

10. The arm-electronics module of claim 9, further comprising:
    a control unit configured to supply control signals to first-heater element electrical-resistance measurement circuit.

11. The arm-electronics module of claim 7, further comprising:
    a second-heater element electrical-resistance measurement circuit for said embedded contact sensor element, said second-heater element electrical-resistance measurement circuit fabricated on said substrate.

12. The arm-electronics module of claim 11, wherein said second-heater element electrical-resistance measurement circuit for said embedded contact sensor element is configured to measure electrical-resistance changes of said embedded contact sensor element on an order of about 0.1%.

13. The arm-electronics module of claim 11, further comprising:
    a control unit configured to supply control signals to second-heater element electrical-resistance measurement circuit.

14. The arm-electronics module of claim 7, wherein said second heater-element power supply is configured to supply a second maximum power to said embedded contact sensor element that is less than a first maximum power supplied to said first heater element by said first heater-element power supply, but greater than said first heater-element power increment supplied to said first heater element by said first heater-element power supply.

15. The arm-electronics module of claim 7, further comprising:
    a monolithic integrated circuit.

16. A hard-disk drive, comprising:
    at least one magnetic-recording disk;
    at least one magnetic-recording head comprising:
       a write element configured for writing data to a magnetic-recording disk;
       a read element configured for reading back data from said magnetic-recording disk written by said write element;
       a first heater element configured as a first thermal fly-height control element to coarsely adjust a fly-height of said magnetic-recording head with respect to said magnetic recording disk; and
       an embedded contact sensor element configured to detect contact with said magnetic-recording disk, and configured to function as a second heater element, said second heater element configured as a second thermal fly-height control element to finely adjust said fly-height;

wherein said first heater element is configured to produce a first stroke-length larger than a second stroke-length of said second heater element for adjusting said fly-height;
wherein said magnetic-recording head is configured to read data from, and to write data to, said magnetic-recording disk; and
an arm-electronics module comprising:
a substrate;
a write-signal amplifier configured to amplify a write signal sent to a write element of said magnetic-recording head;
a read-signal amplifier configured to amplify a read-back signal sent from a read element of said magnetic-recording head;
a first heater-element power supply configured to provide power in at least one first heater-element power increment to said first heater element of said magnetic-recording head;
a second heater-element power supply configured to provide power to said embedded contact sensor element of said magnetic-recording head; and
wherein said write-signal amplifier, said read-signal amplifier, said first heater-element power supply and said second heater-element power supply are fabricated on said substrate.

17. The hard-disk drive of claim 16, wherein said first stroke-length of said first heater element is about 10 nm.

18. The hard-disk drive of claim 16, wherein said wherein said second stroke-length of said second heater element is about 0.5 nm.

19. The hard-disk drive of claim 16, wherein said embedded contact sensor element is configured to provide sensitivity for detection of a head-disk-interference event that causes an increase of temperature of said embedded contact sensor element on an order of at least about 1%.

20. The hard-disk drive of claim 16, wherein said second-heater element electrical-resistance measurement circuit for said embedded contact sensor element is configured to measure electrical-resistance changes of said embedded contact sensor element on an order of about 0.1%.

21. The hard-disk drive of claim 16, wherein said second heater-element power supply is configured to supply a second maximum power to said embedded contact sensor element that is less than a first maximum power supplied to said first heater element by said first heater-element power supply, but greater than said first heater-element power increment supplied to said first heater element by said first heater-element power supply.

* * * * *

UNITED STATES PATENT AND TRADEMARK OFFICE
CERTIFICATE OF CORRECTION

PATENT NO.        : 8,773,801 B2
APPLICATION NO.   : 12/909694
DATED             : July 8, 2014
INVENTOR(S)       : Masayuki Kurita et al.

Page 1 of 1

It is certified that error appears in the above-identified patent and that said Letters Patent is hereby corrected as shown below:

On the Title Page, Item (56) OTHER PUBLICATIONS: Delete "Zheng, Hao et al., "Numerical Simulation of a Thermal Flying Height Control Slider With Dual Heaterand Unsulator Elements", http://ieeexplore.ieee.org/stamp/stamp.jsp?arnumber=5257206&isnumber=5256997. Abstract, Oct. 2009."

Insert --Zheng, Hao et al., "Numerical Simulation of a Thermal Flying Height Control Slider With Dual Heater and Insulator Elements", http://ieeexplore.ieee.org/stamp/stamp.jsp?arnumber=5257206&isnumber=5256997, Abstract, Oct. 2009.--

Signed and Sealed this
Seventeenth Day of March, 2015

Michelle K. Lee
*Director of the United States Patent and Trademark Office*